United States Patent [19]

Absil et al.

[11] Patent Number: 5,231,064
[45] Date of Patent: Jul. 27, 1993

[54] CRACKING CATALYSTS COMPRISING PHOSPHORUS AND METHOD OF PREPARING AND USING THE SAME

[75] Inventors: Robert P. L. Absil, Mantua; Joseph A. Herbst, Turnersville, both of N.J.

[73] Assignee: Mobil Oil Corp., Fairfax, Va.

[21] Appl. No.: 667,854

[22] Filed: Mar. 12, 1991

[51] Int. Cl.$^5$ .............. B01J 27/14; B01J 29/04
[52] U.S. Cl. ........................................... 502/68
[58] Field of Search ............ 502/68, 81; 208/114

[56] References Cited

U.S. PATENT DOCUMENTS

| | | | |
|---|---|---|---|
| 3,316,110 | 4/1967 | Herbst et al. | 106/65 |
| 3,354,096 | 11/1967 | Young | 252/435 |
| 3,867,279 | 2/1975 | Young | 208/114 |
| 4,356,338 | 10/1982 | Young | 208/114 |
| 4,454,241 | 6/1984 | Pine et al. | 502/68 |
| 4,567,152 | 1/1986 | Pine | 502/64 |
| 4,584,091 | 4/1986 | Pine | 208/114 |
| 4,839,319 | 6/1989 | Schnette et al. | 502/64 |
| 4,873,211 | 10/1989 | Walker et al. | 502/64 |
| 4,970,183 | 11/1990 | Nakamoto et al. | 502/68 |
| 5,082,815 | 1/1992 | Macedo | 502/68 |

FOREIGN PATENT DOCUMENTS 0358261  3/1990  European Pat. Off. .

*Primary Examiner*—Carl F. Dees
*Attorney, Agent, or Firm*—Alexander J. McKillop; Dennis P. Santini

[57] ABSTRACT

The present invention is directed to a phosphorus containing catalyst which is formed by spray drying at a pH preferably less than 3. The present invention also comprises methods for preparing catalysts comprising phosphoric acid treated clay, as well as methods for cracking hydrocarbons utilizing the novel catalysts disclosed herein. The catalysts of the present invention advantageously exhibit low attritability.

27 Claims, No Drawings

5,231,064

CRACKING CATALYSTS COMPRISING PHOSPHORUS AND METHOD OF PREPARING AND USING THE SAME

FIELD OF THE INVENTION

This invention relates to the catalytic cracking of hydrocarbons. More particularly, this invention relates to the preparation and use of novel zeolite catalytic cracking catalysts containing phosphorus treated clay. The catalysts of the present invention are highly attrition resistant and have improved activity for gasoline octane enhancement or light olefin production in the catalytic cracking of crude oil.

BACKGROUND OF THE INVENTION

Catalytic cracking operations are commercially employed in the petroleum refining industry to produce useful products, such as high quality gasoline and fuel oils, from hydrocarbon-containing feeds. The endothermic catalytic cracking of hydrocarbons is most commonly practiced in accordance with two known catalytic cracking operations, namely, fluid catalytic cracking (FCC) and moving bed catalytic cracking.

Generally, both fluid catalytic cracking and moving bed operations are commercially practiced in a cyclic mode. During these operations, the hydrocarbon feedstock is contacted with hot, active, solid particulate catalyst without added hydrogen, for example, at pressures of up to about 50 psig and temperatures up to about 1200° F. As the hydrocarbon feed is cracked in the presence of cracking catalyst to form more valuable and desirable products, undesirable carbonaceous residue known as "coke" is deposited on the catalyst. The spent catalyst contains coke as well as metals that are present in the feedstock.

In FCC operations, the catalyst is a fine powder with particle sizes of about 20-200 microns in diameter and with an average size of approximately 60-100 microns. The fine powder is propelled upwardly through a riser reaction zone, fluidized and thoroughly mixed with the hydrocarbon feed. The hydrocarbon feed is cracked at high temperatures by the catalyst and separated into various hydrocarbon products. The coked catalyst particles are separated from the cracked hydrocarbon products, and after stripping, are transferred into a regenerator where the coke is burnt off to regenerate the catalyst. The regenerated catalyst then flows downwardly from the regenerator to the base of the riser.

The cycles of cracking and regeneration at high flow rates and temperatures have a tendency to physically break down the catalyst into smaller particles, called "fines" which have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled relatively easily by controlling the initial spray drying of the catalyst, if the attrition resistance is poor, the catalytic cracking unit may produce a large amount of the 0-20 micron fines which should not be released into the atmosphere. Commercial catalytic cracking units include cyclones and electrostatic precipitators to prevent fines from becoming airborne. Those skilled in the art appreciate that excessive generation of catalyst fines increases the cost of catalyst to the refiner.

Additionally, the catalyst particles cannot be too large in diameter, or the particles may not be sufficiently fluidized. Therefore, the catalysts are preferably maintained under 120 to 150 microns in diameter.

Another consideration is deposition of coke on the catalyst particles which is generally considered undesirable for two reasons: first, it inevitably results in a decline in catalytic activity to a point where the catalyst is considered to have become "spent"; and second, coke generally forms on the catalyst at the expense of more desired light liquid products. To regenerate the catalytic activity, the hydrocarbon residues of the coke must be burnt off the "spent" catalyst at elevated temperatures in a regenerator.

Current worldwide refinery trends indicate a continuing need to process heavier feed stock. As a result, many refineries will be processing feedstock containing resids or deeper cut gas oils which have high metals contents. The enhancement of octane produced in catalytic cracking operations is an important goal in the preparation of zeolite containing catalysts. The environmental regulations in the United States and abroad, and the phaseout of lead additives for gasolines in both the U.S. and abroad, provide a strong incentive for refineries to use catalysts which produce increased octane gasolines from heavier metals contaminated feedstock.

Therefore, it would be highly desirable to prepare a catalyst having a high attrition resistance. It would also be desirable to provide fluid catalysts having reduced manufacturing costs and improved catalytic activity for octane enhancement. Those skilled in the art will appreciate that improved attrition resistance as well as improved activity will translate into reduced catalyst makeup rates.

SUMMARY OF THE INVENTION

The present invention is directed to a fluid catalyst comprising clay and a zeolite, at least one of which has been treated with a phosphorus containing compound, for example ammonium dihydrogen phosphate or phosphoric acid, and which is spray dried at a low pH, preferably lower than about 3. The present invention also comprises methods for preparing catalysts comprising phosphorus treated clay, as well as methods for cracking hydrocarbons utilizing the novel catalysts disclosed herein. The catalysts of the present invention advantageously exhibit reduced attrition.

DETAILED DESCRIPTION

One preferred embodiment of the present invention comprises a fluid catalyst formed from a zeolite and a phosphorus treated clay. The catalysts of the present invention exhibit greater attrition resistance, as well as a higher catalytic activity for gasoline octane enhancement or light olefin production, than catalysts similarly formed without the phosphoric acid treatment of the clay.

Those skilled in the art will appreciate that one conventional method of forming catalysts is to add a zeolite slurry to a clay slurry, thoroughly mix the slurry mixture to form a single homogeneous slurry, and then spray dry that mixture. The spray dried catalyst may then be calcined to further increase the attrition resistance.

The catalysts of one embodiment of the present invention are prepared in a modified method wherein the clay slurry is mixed with a source of phosphorus, e.g. phosphoric acid, prior to mixing with the zeolite slurry.

The term "zeolite" as used herein designates the class of porotectosilicates, i.e., porous crystalline silicates, which contain silicon and oxygen atoms as the major components. Other framework components can be present in minor amount, usually less than about 14 mole %, and preferably less than 4%. These components include aluminum, gallium, iron, boron, etc., and combinations thereof. The crystalline aluminosilicates constitute an especially well known type of zeolite. Unless otherwise noted, all percentages herein are based on total solids.

According to a preferred method of the present invention, after the clay/phosphoric acid slurry has been added to the zeolite slurry and any desired adjustments have been made to the solids percentage, the pH of the slurry mixture is adjusted to below about 3, most preferably to below about 2, prior to spray drying. It has been found that these pH ranges are suitable for obtaining a satisfactory attrition resistance.

The catalysts of the present invention are formed in the absence of other non-zeolitic inorganic oxide matrices. As used herein, the phrase "other non-zeolitic inorganic oxide matrices" is meant to include oxide matrices such as silica, alumina, silica-alumina, magnesia, boria, titania, zirconia and mixtures thereof. The catalyst matrix of the present invention does not contain any added silica and/or alumina which is introduced as gels or sols.

In light of the relatively low pH of the slurry prior to spray drying, the zeolites used in practicing the present invention should be acid stable at a pH below about 3, most preferably in the pH range of about 1-2. As used herein, the term "acid stable" means that the zeolite will undergo minimal removal of framework components, for example, aluminum, gallium, iron, boron, etc. which are usually present in minor amounts, in the stated pH range. Suitable acid stable zeolites have $SiO_2/Al_2O_3$ ratios greater than 20/1, preferably greater than 26/1, and most preferably greater than 35/1.

The zeolite may be a large pore zeolite such as USY, REUSY, dealuminated Y, silica-enriched dealuminated Y, zeolite beta or an intermediate pore zeolite such as ZSM-5, ZSM-11, ZSM-22, ZSM-23, ZSM-35, ZSM-48 or ZSM-57 or small pore zeolites including erionite and ZSM-34. According to the present invention the zeolite $SiO_2/Al_2O_3$ ratio is advantageously sufficiently high to minimize framework dealumination in the stated pH range. The high $SiO_2/Al_2O_3$ ratio zeolite can either be synthesized directly or can be obtained by, for example, steaming, followed by acid dealumination of a low $SiO_2/Al_2O_3$ ratio zeolite. The phosphorus-containing catalysts show improved catalytic performance over their phosphorus-free analogs.

The zeolite slurry is mixed with the phosphoric acid/clay slurry and the slurry solids are preferably adjusted to about 25% by weight. It may be necessary to adjust the pH of this slurry, particularly when sources of phosphorus other than phosphoric acid are utilized. After thorough mixing, the slurry is spray dried and, preferably, calcined, for example, at temperatures ranging from 400°-1200° F. for time periods of about 1 minute-48 hours. For example, the catalysts of the present invention may comprise about 10-20 wt % zeolite, about 5-10 wt % phosphorus ($P_2O_5$), and about 70-85 wt % clay.

Suitable sources of phosphorous include phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, and mixtures thereof.

The following examples are provided to further illustrate the present invention. A series of ZSM-5 fluid catalysts containing 15% by weight of 55/1 $SiO_2/Al_2O_3$ ZSM-5, clay and phosphoric acid were prepared. As a control, in Example 1 a catalyst comprising ZSM-5 and clay was prepared without the phosphoric acid treatment. Catalyst preparations illustrating the benefits of phosphoric acid treatment are described in Examples 2 through 15.

EXAMPLE 1

A slurry containing 375 grams of dried 55/1 $SiO_2/Al_2O_3$ ZSM-5 crystals and 2.5 grams of Marasperse N-22 dispersant (Daishowa Chemicals Inc., Rothchild, Wis.) was diluted to 33% solids with DI water and ballmilled for 16 hours in a one-gallon porcelain ballmill containing agate stones. After ball-milling, the slurry was recovered and rinse water was added to the slurry to reduce the solids content to 20 wt %. A clay slurry was separately prepared by combining 2456.2 grams of Kaolin (86.51% solids) (Georgia Kaolin Company, Elizabeth, N.J.) and 2652.6 grams of DI water. The pH of the clay slurry was 6.73 at 20° C. In a stirred vessel, the clay slurry was further diluted by adding 2107 grams of DI water. Next, the zeolite slurry was added to the clay slurry and the slurry solids was adjusted to 25 wt %. After homogenization, the slurry was spray dried. A portion of the resulting catalyst, identified as catalyst A, was calcined for 2 hours at 1200° F. in air. The catalyst consisted of 15% ZSM-5 and 85% clay.

Attrition Test

To determine the attrition index of each of the fluid catalysts, 7.0 cc of sample was contacted in a 1.0 inch U-tube with an air jet formed by passing humidified (60% air through a 0.07 inch nozzle at 21 liter/minute for 1 hour. The attrition index is defined as the percent of 0–20 micron fines generated during the test relative to the amount of >20 micron material initially present.

$$AI = 100 \times \frac{\text{wt \% of fines } AA - \text{wt \% fines } BA}{100 - \text{wt \% of fines } BA},$$

Where AA means after attrition; BA means before attrition and fines means wt % of 0–20 micron material. The lower the attrition index, the more attrition resistant is the catalyst.

The uncalcined as well as the calcined catalysts prepared in Example 1 attrited completely to fines in 10 minutes after having been charged to the U-tube.

EXAMPLE 2

A zeolite slurry containing 375 grams of 55/1 $SiO_2/Al_2O_3$ ZSM-5 (dry basis) at 20% solids was prepared as described in Example 1. 5109 grams of clay slurry was prepared containing 1953.5 grams of Kaolin (dry basis). In addition, an $H_3PO_4$ solution was prepared by adding 275.3 grams of 86.1 weight % $H_3PO_4$ to 1974 grams of DI water. The $H_3PO_4$ solution was gradually added to the clay slurry followed by 15 minutes of stirring. The contact time, i.e. the time that the $H_3PO_4$ was in contact with the clay prior to adding the zeolite, was 95 minutes. The final pH of the phosphoric acid treated clay slurry was 1.28. After combining the $H_3PO_4$ solution and the clay slurry in a stirrer vessel, the zeolite slurry was added. 909 grams of DI water were added. The pH of the slurry was 1.5. Additional DI water was added to adjust the percent solids of the slurry at 25%. After homogenization, the slurry was spray dried. The resulting catalyst identified as catalyst B was calcined for 2 hours at 1200° F. in air. This catalyst consisted of 15% ZSM-5, 78.1% kaolin and 6.9% $P_2O_5$.

The attrition indices of the spray-dried and the calcined catalysts prepared in the present example were 15 and 9, respectively. Comparison of the attrition tests results for the catalysts in Examples 1 and 2 illustrates the benefits of treating the clay with phosphoric acid at a low pH.

EXAMPLES 3 THROUGH 5

To assess the impact of phosphorus loading on catalyst attrition resistance, three ZSM-5-containing fluid catalysts were prepared using substantially the same procedure as outlined in Example 2. In the three preparations, respectively identified as catalysts C, D and E, the amount of phosphoric acid and clay added were varied such that the zeolite content remained constant at 15.1±.1%. The results are summarized below:

TABLE 1

Effect of Phosphoric Acid Level on Attrition Resistance 55/1 $SiO_2/Al_2O_3$ ZSM-5 Fluid Catalysts

| | Composition | | | Attrition Index | |
|---|---|---|---|---|---|
| Catalyst | Zeolite (wt %) | Clay (wt %) | $P_2O_5$ (wt %) | Spray-Dried | Calcined |
| C | 15.1 | 82.0 | 2.9 | 71 | 61 |
| D | 15.0 | 78.1 | 6.9 | 21 | 7 |
| B | 15.0 | 78.1 | 6.9 | 15 | 9 |
| E | 15.2 | 75.9 | 8.9 | 4 | 4 |

The results show that, at a zeolitic $SiO_2/Al_2O_3$ ratio of 55/1, $P_2O_5$ levels >2.9 wt %, preferably >6.9 wt %, are required to obtain fluid catalysts with significantly reduced attrition indices. For convenience, the amount of phosphorus present is reported as $P_2O_5$.

EXAMPLES 6 THROUGH 10

To assess the impact of zeolitic $SiO_2/Al_2O_3$ ratio on catalyst attrition resistance, five zeolite-containing fluid catalysts were prepared using substantially the same procedure as outlined in Example 2. In the five preparations, identified as catalysts F-J, only the zeolite was varied. In other respects, the compositions were not changed. The results are as summarized below:

TABLE 2

| | Nominal | | Attrition Index | |
|---|---|---|---|---|
| Catalyst | $SiO_2/Al_2O_3$ (Zeolite-Type) | pH | Spray-Dried | Calcined |
| F | 5/1 (USY) | 2.6 | 69 | 87 |
| G | 26/1 (ZSM-5) | 1.5 | 55 | 17 |
| H | 55/1 (ZSM-5) | 1.5 | 15 | 9 |
| I | 500/1 (ZSM-5) | 1.6 | 15 | 7 |
| J | 500/1 (ZSM-5) | 1.9 | 17 | 3 |

The attrition results show that as the zeolitic $SiO_2/Al_2O_3$ ratio increases from 5/1 to 500/1 and as the zeolite becomes more acid stable, the attrition indices of the spray-dried and calcined catalysts decrease dramatically.

EXAMPLES 11 THROUGH 15

To ascertain the effect of slurry pH on attrition resistance, six ZSM-5 catalysts, identified as catalysts K-P, were prepared which consisted of 15% zeolite, 78.1% clay and 6.9% $P_2O_5$.

A zeolite slurry containing 375 grams of 55/1 $SiO_2/Al_2O_3$ ZSM-5 (dry basis) was prepared as described in Example 1. 5109 grams of clay slurry was prepared containing 1953.5 grams of Kaolin (dry basis). In addition, an $H_3PO_4$ solution was prepared by adding 275.3 grams of 86.1 wt % $H_3PO_4$ to 1974 grams of DI water. After combining the $H_3PO_4$ solution and the clay slurry in a stirred vessel, the zeolite slurry was added. An additional 909 grams of DI water were added to adjust the percent solids of the slurry. Next, a dilute solution of $NH_4OH$ or $HNO_3$ was prepared and added to the slurry to adjust the slurry pH to the desired level. Additional DI water was added to adjust the slurry solids to about 24 wt %. After homogenization, the slurry was spray dried. The resulting catalysts were calcined for 2 hours at 1200° F. in air. The pH was varied from 1 to 10. The results are summarized below:

TABLE 3

Effect of Slurry pH on Attrition Resistance

| | | Attrition Index | |
|---|---|---|---|
| Catalyst | Slurry pH | Spray-Dried | Calcined |
| K | 1.0 | 22 | 8 |
| L | 2.0 | 25 | 7 |
| M | 3.0 | 59 | 20 |
| N | 4.6 | 46 | 28 |
| O | 6.5 | 76 | 30 |
| P | 10 | 43 | 17 |

The results demonstrate that at a $P_2O_5$ content of 6.9 wt %, the slurry pH prior to spray drying should be maintained at <3, preferably ≦2, to obtain a fluid catalyst with a low attrition index.

EXAMPLE 16

The base catalyst employed in the present study was a commercially-available REY-type catalyst which had been removed from a commercial FCC unit following oxidative regeneration. This catalyst is hereinafter referred to as Catalyst Q.

EXAMPLE 17

A commercially manufactured 25% ZSM-5 additive catalyst was steam-deactivated at 1450° F. for 10 hours in 45% steam/55% air at 0 psig. The resulting catalyst was blended with catalyst Q to a ZSM-5 concentration of 2 wt %. The blend prepared in this example will be referred to as catalyst R.

EXAMPLE 18

A large batch of catalyst was prepared according to the procedure employed for preparing catalyst N. This catalyst, identified as catalyst S, was calcined for 3 hours at 1200° F. in air; a heating rate of 5° F./min was used. The resulting catalyst T was steam-deactivated at substantially the same conditions as the catalyst in Example 17. The steamed catalyst U was blended with Catalyst Q to a ZSM-5 concentration of 0.3 wt %. The blend prepared in this example will be referred to as catalyst V.

Catalysts Q, R and V were evaluated for cracking a Sour Heavy Gas Oil, having the properties listed in Table 4, in a fixed-fluidized bed (FFB) unit at 960° F. over a range of catalyst/oil ratios. The performance of the three catalysts at 65 vol % conversion was determined via interpolation; the results are shown in Table 5. Yield/octane shifts for catalysts R and V have been summarized in Table 6. The data show that Catalyst V is substantially more active for octane enhancement (change in Research Octane Number (RON) /wt % ZSM-5 of 11.7 vs. 0.6), as catalyst R without any loss in selectivity (−change in $C_5^+$ gasoline/change in RON of 2.2 vs. 2.8).

TABLE 4

| Properties of a Sour Heavy Gas Oil | |
|---|---|
| Pour Point, °F. | 90 |
| CCR, wt % | 0.34 |
| K.V. @ 40° C. | 38.8 |
| K.V. @ 100° C. | 5.56 |
| Aniline Point, °F. | 162.5 |
| Bromine Number | 4.3 |
| Gravity, API | 21.8 |
| Carbon, wt % | 87.3 |
| Hydrogen, wt % | 12.6 |
| Sulfur, wt % | 2.46 |
| Nitrogen, wt % | 0.12 |
| Basic Nitrogen, ppm | 336 |
| Nickel, ppm | 0.2 |
| Vanadium, ppm | 0.7 |
| Iron, ppm | 3.3 |
| Copper, ppm | <0.1 |
| Sodium, ppm | 0.8 |

TABLE 5

FFB Performance of Catalysts Q, R and V
Yield/ Octane Estimates at 65 vol % Conversion

| Catalyst | Q | R | V |
|---|---|---|---|
| Coke, wt % | 4.4 | 4.6 | 4.7 |
| $C_1$-$C_3$, wt % | 7.5 | 8.8 | 12.0 |
| $C_4^s$, wt % | 8.8 | 9.8 | 10.8 |
| $C_5^+$ gasoline, wt % | 42.2 | 39.5 | 35.8 |
| LFO, wt % | 30.2 | 30.2 | 30.2 |
| HFO, wt % | 7.1 | 7.0 | 6.7 |
| RON + 0 | 89.6 | 90.7 | 93.1 |
| $C_5^+$ gasoline, vol % | 50.9 | 47.8 | 43.1 |
| $C_3^=$ + $C_4^=$ + $iC_4$, vol % | 19.5 | 23.5 | 30.4 |

TABLE 6

FFB Performance of Catalysts R and V
Yield/ Octane Shifts at 65 vol % Conversion

| Catalyst | R | V |
|---|---|---|
| −change in $C_5^+$ gasoline, vol % | 3.1 | 7.8 |
| change in $C_3^=$ + $C_4^=$ + $iC_4$, vol % | 4.0 | 10.9 |
| change in RON + 0 | 1.1 | 3.5 |
| change in RON/wt % ZSM-5 | 0.6 | 11.7 |
| Selectivity (−change in $C_5^+$ gasoline/change in RON) | 2.8 | 2.2 |

The preparation of the catalysts at a slurry pH of 1.0 (K), 2.0 (L), 3.0 (M), 4.6 (N) and 6.5 (O) is described above. Catalysts (D and B) spray dried at a slurry pH of 1.8 and 1.5, respectively, were also described above.

Each of spray dried catalysts B, D, K, L, M, N and O described above was calcined for 3 hours at 1200° F. in air and then steam-deactivated at substantially the same conditions as the catalyst in Example 17.

The steamed ZSM-5 catalysts were blended with Catalyst Q to a ZSM-5 concentration of 0.3 wt %. The blends prepared in these examples will be referred to as Catalyst K2 (pH=1), Catalyst D2 (pH=1.8), Catalyst B2 (pH=1.5), Catalyst L2 (pH=2), Catalyst M2 (pH=3), Catalyst N2 (pH=4.6), Catalyst O2 (pH=6.5).

These catalysts were evaluated for cracking a Sour Heavy Gas Oil in a fixed-fluidized bed unit at 960° F. over a range of catalyst/oil ratios. Properties of this chargestock are summarized in Table 7. The performance of the catalysts was determined at 65 vol % conversion via interpolation and catalyst activity for octane enhancement (change in RON/wt % ZSM-5) and selectivity (−change in $C_5^+$ gasoline/change in RON) were calculated. The results are summarized in Table 8. The data in Table 8 indicate that slurry pH does not significantly impact catalytic performance.

TABLE 7

| Properties of a Sour Heavy Gas Oil | |
|---|---|
| Pour Point, °F. | 90 |
| CCR, wt % | 0.54 |
| K.V. 040° C. | N/A |
| K.V. 0100° C. | 8.50 |
| Aniline Point, °F. | 170.5 |
| Bromine Number | 8.7 |
| Carbon, wt % | 87.1 |
| Hydrogen, wt % | 12.1 |
| Sulfur, wt % | 2.1 |
| Nitrogen, wt % | 0.41 |
| Basic Nitrogen, ppm | 382 |
| Nickel, ppm | 0.3 |
| Vanadium, ppm | 0.4 |
| Iron, ppm | 0.3 |
| Copper, ppm | 20 |
| Sodium, ppm | 1.3 |

TABLE 8

Catalytic Performance Of
Phosphoric Acid Treated ZSM-5/Clay Additive Catalysts

| Catalyst | Q | K2 | D2 | B2 | L2 | M2 | N2 | O2 |
|---|---|---|---|---|---|---|---|---|
| Slurry pH | Eq. REY | 1.0 | 1.8 | 1.5 | 2.0 | 3.0 | 4.6 | 6.5 |
| Conversion, Vol % | ← | ← | ← | 65 | → | → | → | → |
| Coke, wt % | 5.0 | 4.7 | 5.2 | 4.7 | 4.7 | 4.7 | 5.0 | 4.5 |
| $C_1$-$C_3$, wt % | 7.4 | 10.3 | 9.3 | 12.1 | 12.1 | 10.7 | 11.0 | 10.0 |
| $C_4$, wt % | 7.5 | 10.8 | 9.8 | 11.4 | 10.5 | 10.3 | 11.3 | 11.3 |
| $C_5^+$ gasoline, wt % | 42.6 | 36.5 | 38.0 | 34.3 | 35.0 | 36.4 | 35.0 | 36.0 |
| LFO, wt % | 29.2 | 30.1 | 29.6 | 29.4 | 29.8 | 29.7 | 29.5 | 29.9 |
| HFO, wt % | 8.3 | 7.8 | 8.0 | 8.4 | 7.9 | 8.1 | 8.1 | 7.9 |
| RON | 90.7 | 92.7 | 92.8 | 93.4 | 92.7 | 93.6 | 93.5 | 93.5 |
| −change in $C_5^+$ gasoline (vol %)/ change in RON | | 3.8 | 2.6 | 3.9 | 4.7 | 2.6 | 3.4 | 2.9 |
| change in RON/wt % ZSM-5 | | 6.7 | 7.0 | 9.0 | 6.7 | 9.7 | 9.3 | 9.3 |

Each of spray-dried catalysts C, D, B and E were calcined at 1200° F. for 3 hours in air and steam deactivated at substantially the same conditions as the catalyst in Example 17. The steamed catalysts were blended with Catalyst Q to a ZSM-5 concentration of 0.3 wt %. The blends will be referred to as Catalysts C2, D2, B2 and E2. Catalytic results showing the negligible effect of $P_2O_5$ content on ZSM-5 FCC additive performance, over the $P_2O_5$ range examined, are detailed below in Table 9.

TABLE 9
EFFECT OF P₂O₅ CONTENT ON ZSM-5 ADDITIVE CATALYST PERFORMANCE

| Catalyst | Q | C2 | D2 | B2 | E2 |
|---|---|---|---|---|---|
| $P_2O_5$ Content, wt % | Eq. REY | 2.9 | ← 6.9 → | | 8.9 |
| Yields, wt % (@65 vol % conv.) | | | | | |
| Coke | 5.0 | 4.7 | 5.2 | 4.7 | 5.0 |
| $C_1$-$C_3$ | 7.4 | 11.7 | 9.3 | 12.1 | 10.5 |
| $C_4$ | 7.5 | 11.3 | 9.8 | 11.4 | 9.9 |
| $C_5^+$ gasoline | 42.6 | 34.5 | 38.0 | 34.3 | 36.7 |
| LFO | 29.2 | 29.6 | 29.6 | 29.4 | 29.8 |
| HFO | 8.3 | 8.3 | 8.0 | 8.4 | 8.1 |
| RON | 90.7 | 93.5 | 92.8 | 93.4 | 92.8 |
| −change in $C_5^+$ Gasoline (vol %)/change in RON | | 3.5 | 2.6 | 3.9 | 3.5 |
| change in RON/ wt % ZSM-5 | | 9.3 | 7.0 | 9.0 | 7.0 |

The following examples illustrate the advantages of one preferred embodiment of the present invention wherein the contact time between the phosphoric acid and the clay slurry is limited. As illustrated in these examples, even further improvements in attrition resistance are obtained. It is believed that by reducing the contact time between the source of phosphorus and the clay prior to zeolite addition, more bonding occurs between the phosphorus and the zeolite leading to better attrition resistance.

For comparative purposes, catalysts B and D were used as an example of a phosphorus-treated ZSM-5/clay catalyst prepared in a manner such that the contact time between the phosphoric acid and the clay prior to zeolite addition to the slurry was not limited.

EXAMPLE 19

A zeolite slurry containing 375 g of 55/1 $SiO_2/Al_2O_3$ ZSM-5 (dry basis) at 20% solids was prepared in the manner described in Example 1. 5109 g. of a clay slurry was prepared containing 1953.5 g of Kaolin. In addition, an $H_3PO_4$ solution was prepared by adding 275.7 g of 86% $H_3PO_4$ to 1974 g of DI water. The $H_3PO_4$ solution was added to the clay slurry over an 85 minute period. The final pH of the phosphoric acid-treated clay slurry was 1.27. Next, the zeolite slurry was added and the resulting slurry was stirred for an additional 15 minutes. An additional 909 g of DI water were then added; the final slurry pH was 1.53. The mixture was allowed to age for 48 hours with stirring. Additional DI water was added to adjust the solids percentage of the slurry to 25%. After homogenization, the slurry was spray dried. The resulting catalyst identified as catalyst Y was calcined for 2 hours at 1200° F. in air.

The attrition indices of the spray-dried and the calcined catalysts prepared in the present example were determined using the procedure outlined above. Attrition indices of 14 and 10 were obtained, respectively. Since the attrition indices of catalysts B and Y are equivalent, it was deemed that the 48-hour aging of the phosphoric acid/clay/zeolite slurry did not affect attrition resistance.

EXAMPLE 20

A zeolite slurry containing 375 g of 55/1 $SiO_2/Al_2O_3$ ZSM-5 (dry basis) at 20% solids was prepared in the manner described in Example 1. 5109 g. of a clay slurry was prepared containing 1953.5 g of Kaolin clay. In addition, an $H_3PO_4$ solution was prepared by adding 275.3 g of 86.1% $H_3PO_4$ to 1974 g of DI water. The $H_3PO_4$ solution was added to the clay slurry over an 11 minute period. The final pH of the phosphoric acid-treated clay slurry was 1.27. Next, the zeolite slurry was added and the resulting slurry was stirred for an additional 15 minutes. An additional 909 g of DI water were then added; the pH was 1.53. DI water was added to adjust the solids percentage of the slurry to 25%. After homogenization, the slurry was spray dried. The resulting catalyst identified as catalyst Z was calcined for 2 hours at 1200° F. in air.

The attrition indices of the spray-dried and the calcined catalysts prepared in the present example were determined using the procedure outlined above. Attrition indices of 11 and 6 were obtained, respectively.

EXAMPLE 21

A zeolite slurry containing 375 g of 55/1 $SiO_2/Al_2O_3$ ZSM-5 (dry basis) at 20% solids was prepared as described in Example 1. 5109 g. of a clay slurry was prepared containing 1953.5 g of Kaolin clay. In addition, an $H_3PO_4$ solution was prepared by adding 275.7 g of 86% $H_3PO_4$ to 1974 g of DI water. The $H_3PO_4$ solution was added to the zeolite slurry over a 15 minute period. The final pH of the phosphoric acid-treated zeolite slurry was 1.35. Next, the phosphoric acid/zeolite slurry was added to the clay slurry over an 11 minute period with stirring. The resulting slurry was stirred for an additional 15 minutes. An additional 909 g of DI water were then added; the pH was 1.64. DI water was added to adjust the solids percentage of the slurry to 25%. After homogenization, the slurry was spray dried. The resulting catalyst identified herein as catalyst AA was calcined for 2 hours at 1200° F. in air.

The attrition indices of the spray dried and the calcined catalysts prepared in the present example were determined using the procedure outlined above. Attrition indices of 7 and 8 were obtained, respectively. A repeat evaluation yielded 10 and 6, respectively. Average uncalcined and calcined attrition indices of 8 and 7 were obtained indicating that upon calcination, the attrition index decreases by only one number.

The attrition results, summarized in Table 10, show that a significant improvement in the attrition index is obtained by minimizing the contact time between the phosphoric acid and the clay prior to zeolite addition to the slurry. The improvement in attrition resistance is due predominantly to an improvement in the uncalcined attrition index.

TABLE 10
Attrition Indices of P/ZSM-5A Catalysts

| Catalyst | Time Phosphorus is in Contact with Clay Prior to Addition of ZSM-5 | Spray Dried | Calcined |
|---|---|---|---|
| A | No phosphorus | 100 | 100 |
| D | 95 min | 21 | 7 |
| B | 95 min | 15 | 9 |
| Y | 85 min[1] | 14 | 10 |
| Z | 11 min | 11 | 6 |
| AA | 0 min | 8 | 7 |

[1]Followed by 48 hours of aging of the P/ZSM-5/clay slurry.

Each of spray dried catalysts B, D and AA were calcined at 1200° F. for 3 hours in air and were steam-deactivated at substantially the same conditions as the catalyst described in Example 17. The steamed catalysts were blended with catalyst Q to a ZSM-5 concentration of 0.3 wt %. The blends will be referred to as catalysts B2, D2 and AA2.

Minimizing the contact time according to this preferred embodiment does not substantially affect catalytic performance. Catalytic results from Table 11 illustrate the negligible effect of minimizing contact time in the catalyst preparation on ZSM-5 FCC additive performance.

TABLE 11

| Catalyst | Q | D2 | B2 | AA2 |
|---|---|---|---|---|
| Contact Time, Min. | — | ←  95  → | | 0 |
| Yield Distribution wt % (@65 vol % conv.) | | | | |
| Coke | 5.0 | 5.2 | 4.7 | 4.6 |
| $C_1$-$C_3$ | 7.4 | 9.3 | 12.1 | 9.1 |
| $C_4$ | 7.5 | 9.8 | 11.4 | 10.3 |
| $C_5^+$ gasoline | 42.6 | 38.4 | 34.3 | 38.2 |
| LFO | 29.2 | 29.6 | 29.4 | 28.8 |
| HFO | 8.3 | 8.0 | 8.4 | 8.6 |
| RON | 90.7 | 92.8 | 93.4 | 92.6 |
| —change in $C_5^+$ gasoline (vol %)/ change RON | | 2.7 | 3.9 | 2.7 |
| change in RON/ wt % ZSM-5 | | 7.0 | 9.0 | 6.3 |

The following example was performed to test the effect of combining the phosphoric acid with the zeolite slurry prior to ball milling.

EXAMPLE 22

A slurry containing 375 grams of dried ZSM-5 (dry basis) and 2.3 grams of Maraspere N-22 dispersant was diluted to 33% solids by adding 275.3 grams of 86.1 wt % $H_3PO_4$ and DI water and, subsequently, ball-milled for 16 hours in a one-gallon porcelain ballmill containing agate stones. After ball-milling, the slurry was recovered; rinse water was added to the slurry to reduce the solids content to 24.4 wt %. 7083 grams of a clay slurry was prepared containing 1953.5 grams of Kaolin (dry basis). After combining the zeolite/ $H_3PO_4$ slurry and the clay slurry over a 90 minute period, 909 grams of DI water was added. The pH of the slurry was 1.9. Additional DI water was added to adjust the percent solids of the slurry to 25%. After homogenization, the slurry was spray dried. The resulting catalyst BB was calcined for 2 hours at 1200° F. The attrition indices of the spray dried and the calcined catalysts were 47 and 11, respectively.

A comparison of catalyst AA and catalyst BB from examples 21 and 22, respectively, illustrates an improvement in attrition resistance when combining the phosphoric acid with the zeolite slurry after, instead of before, zeolite ball-milling. The spray dried catalyst prepared in Example 22 has a substantially poorer attrition resistance (47 vs 8) than the one in Example 21. After calcination, however, the difference is substantially reduced (11 vs 7).

Catalytic cracking with the catalyst of the present invention can be conducted in any conventional catalytic cracking manner. Suitable catalytic cracking conditions include temperatures of about 700°-1300° F. and a pressure ranging from subatmospheric to about several atmospheres, typically from about atmospheric to about 4 atmospheres. The catalysts of the present invention can be combined as separate particle additives with one or more catalytic cracking catalysts, such as a faujasite-type cracking catalyst, such as REY, USY, RE-USY, dealuminated Y and silicon-enriched dealuminated Y.

One embodiment of the present invention comprises a method of cracking hydrocarbons comprising the step of contacting the hydrocarbons with a mixture comprising a zeolite catalyst as described above and another molecular sieve catalyst. As used herein, the term "molecular sieve" includes adsorbents which selectively adsorb molecules on the basis of the size and shape of the adsorbate molecule. Molecular sieves have a sorption area available on the inside of a large number of uniformly sized pores of molecular dimensions such that molecules of a certain size and shape enter the pores and are adsorbed while larger or differently shaped molecules are excluded. Porotectosilicates are one type of molecular sieve.

The process may be carried out in a fixed bed, moving bed, ebullating bed, slurry, transfer line or fluidized bed operation. The catalysts of the present invention can be used to convert any of the conventional hydrocarbon feeds used in catalytic cracking, that is, it can be used to crack naphthas, gas oils and residual oils having a high content of metallic contaminants. It is especially suited for cracking hydrocarbons boiling in the gas oil range, that is, hydrocarbons oils having an atmospheric pressure boiling point ranging from about 450° to about 1100° F. to yield products having a lower boiling point.

We claim:

1. A method of preparing a zeolite catalyst for cracking hydrocarbons comprising the steps of:
   forming a first slurry comprising clay and a source of phosphorus;
   mixing said first slurry with an acid stable zeolite to form a second slurry; and
   spray drying said second slurry at a pH of below 3 in the absence of other non-zeolitic inorganic oxide matrices.

2. A method according to claim 1 wherein said second slurry is spray dried at a pH of less than or equal to 2.

3. A method according to claim 2 wherein the contact time between said clay and said source of phosphorus prior to said mixing step is less than 30 minutes.

4. A method according to claim 2 wherein the contact time between said clay and said source of phosphorus prior to said mixing step is less than 15 minutes.

5. A method according to claim 1 wherein said second slurry is spray dried at a pH of less than 2.

6. A method according to claim 5 wherein the contact time between said clay and said source of phosphorus prior to said mixing step is less than 30 minutes.

7. A method according to claim 1 wherein the catalyst is calcined.

8. A method according to claim 1 wherein said acid stable zeolite has a $SiO_2/Al_2O_3$ ratio greater than 26/1.

9. A method according to claim 5 wherein the contact time between said clay and said source of phosphorus prior to said mixing step is less than 15 minutes.

10. A method according to claim 1 wherein the contact time between said clay and said source of phosphorus prior to said mixing step is less than 30 minutes.

11. A method according to claim 1 wherein the contact time between said clay and said source of phosphorus prior to said mixing step is less than 15 minutes.

12. A method according to claim 1 wherein said source of phosphorus is selected from the group consisting of phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite and mixtures thereof.

13. A method according to claim 1 wherein said source of phosphorus is phosphoric acid.

14. A method according to claim 1 further comprising the step of adjusting the pH of said second slurry to below 3 prior to said spray drying.

15. A method according to claim 1 wherein said clay comprises Kaolin.

16. A method according to claim 1 further comprising the step of deagglomerating said zeolite prior to said mixing step.

17. A method according to claim 1 wherein said acid stable zeolite comprises ZSM-5.

18. A method according to claim 1 wherein said second slurry consists essentially of clay, phosphoric acid, and said acid stable zeolite.

19. A zeolite catalyst formed by the method of claim 10.

20. A zeolite catalyst formed by the method of claim 2.

21. A zeolite catalyst formed by the method of claim 1.

22. A zeolite catalyst formed by the method of claim 1 having a spray dried attrition index of 30 or below.

23. A zeolite catalyst formed by the method of claim 1 having a calcined attrition index <10.

24. A zeolite catalyst for cracking hydrocarbons formed by a process comprising the steps of:
    forming a slurry comprising clay, a source of phosphorus and an acid stable zeolite; and
    spray drying said slurry at a pH of below 3 in the absence of other non-zeolitic inorganic oxide matrices.

25. A zeolite catalyst according to claim 24 wherein said pH is $\leq 2$.

26. A zeolite catalyst according to claim 25 having a calcined attrition index of $\leq 10$.

27. A zeolite catalyst for cracking hydrocarbons formed by a process comprising the steps of:
    forming a slurry comprising clay, a source of phosphorus and an acid stable zeolite; and
    spray drying said slurry in the absence of other non-zeolitic inorganic oxide matrices at a pH which is sufficiently low to provide a calcined attrition index of $\leq 10$.

* * * * *